(12) United States Patent
Tsunoda et al.

(10) Patent No.: US 10,495,827 B2
(45) Date of Patent: Dec. 3, 2019

(54) OPTICAL CONNECTOR

(71) Applicant: KYOCERA CORPORATION, Kyoto (JP)

(72) Inventors: Masatoshi Tsunoda, Machida (JP); Takahiro Suzuki, Yamato (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/307,341

(22) PCT Filed: May 11, 2017

(86) PCT No.: PCT/JP2017/017908
§ 371 (c)(1),
(2) Date: Dec. 5, 2018

(87) PCT Pub. No.: WO2017/212861
PCT Pub. Date: Dec. 14, 2017

(65) Prior Publication Data
US 2019/0137699 A1 May 9, 2019

(30) Foreign Application Priority Data

Jun. 7, 2016 (JP) .................................. 2016-113837

(51) Int. Cl.
*G02B 6/38* (2006.01)
*G02B 6/36* (2006.01)
(Continued)

(52) U.S. Cl.
CPC .............. *G02B 6/3882* (2013.01); *G02B 6/36* (2013.01); *G02B 6/3885* (2013.01); *G02B 6/40* (2013.01); *G02B 6/42* (2013.01)

(58) Field of Classification Search
CPC ...... G02B 6/3882; G02B 6/3885; G02B 6/40; G02B 6/42
See application file for complete search history.

(56) References Cited

U.S. PATENT DOCUMENTS 5,940,562 A * 8/1999 Henson ................ G02B 6/3885
385/88
6,450,698 B1 9/2002 Chen
(Continued)

FOREIGN PATENT DOCUMENTS

| JP | 2007-33491 A | 2/2007 |
| JP | 2013-29624 A | 2/2013 |
| KR | 20020050140 A | 6/2002 |

OTHER PUBLICATIONS

International Search Report dated Aug. 1, 2017, in corresponding International Application No. PCT/JP2017/017908.

*Primary Examiner* — Daniel Petkovsek
(74) *Attorney, Agent, or Firm* — Duane Morris LLP

(57) ABSTRACT

An optical connector according to the present disclosure is an optical connector for optically coupling a first optical transmission path and a second optical transmission path, including a first connector part disposed so as to cover at least a part of the first optical transmission path the first connector part including a first positioning portion for performing positioning with respect to the first optical transmission path a second positioning portion for performing positioning of the second optical transmission path held by the second connector part connected to the first connector part and a measurement auxiliary portion formed so as to correspond to the arrangement of the second positioning portion, wherein at least a part of the first positioning portion and at least a part of the measurement auxiliary portion are formed at positions that can be visually recognized simultaneously from the same direction.

4 Claims, 9 Drawing Sheets

(51) Int. Cl.
    *G02B 6/40* (2006.01)
    *G02B 6/42* (2006.01)

(56) References Cited

U.S. PATENT DOCUMENTS

| | | |
|---|---|---|
| 6,592,268 B2 | 7/2003 | Chen |
| 9,429,722 B2 * | 8/2016 | Takahashi ............ G02B 6/3893 |
| 2001/0041030 A1 | 11/2001 | Chen |
| 2012/0134630 A1 * | 5/2012 | Tsujita ................... G02B 6/138 |
| | | 385/78 |
| 2012/0155802 A1 * | 6/2012 | Hsu ...................... G02B 6/4214 |
| | | 385/33 |
| 2014/0301700 A1 | 10/2014 | Matsubara et al. |

* cited by examiner

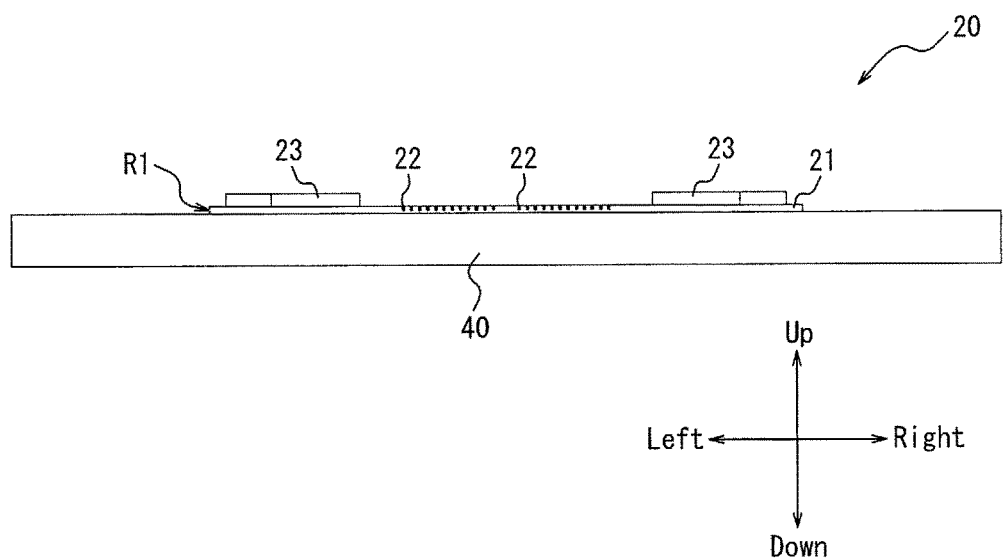
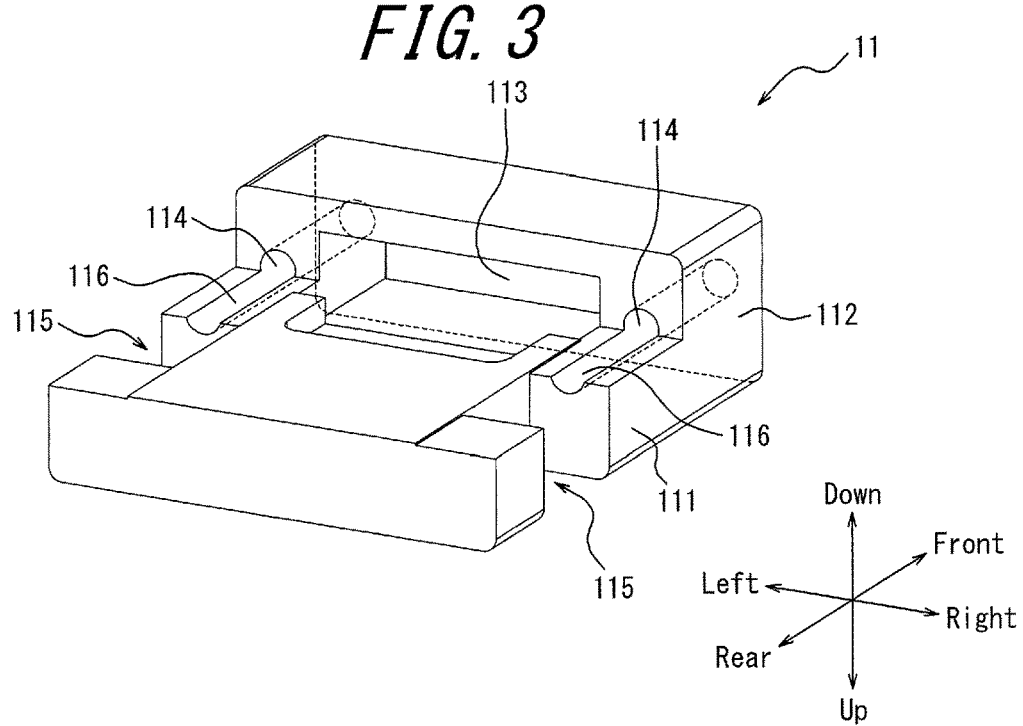

OPTICAL CONNECTOR

CROSS-REFERENCE TO RELATED APPLICATION

This application claims priority to and the benefit of Japanese Patent Application No. 2016-113837 filed Jun. 7, 2016, the entire contents of which are incorporated herein by reference.

TECHNICAL FIELD

The present disclosure relates to an optical connector for optically coupling optical transmission paths.

BACKGROUND

Conventionally, optical connectors for optically coupling optical transmission paths are known. Particularly, an optical connector that couples an optical waveguide provided on a substrate and an optical cable constituted by a plurality of optical fibers is known.

For example, in the optical connector described in Patent Literature (PTL) 1, respective protrusions formed on an optical waveguide are inserted into respective hole portions formed in a receptacle mounted on a substrate and the position of the receptacle with respect to the optical waveguide is adjusted. A plug is connected to the receptacle and the positions of the optical waveguide and optical fibers are adjusted.

CITATION LIST

Patent Literature

PTL 1: JP 2013-029624 A

SUMMARY

Technical Problem

In the aligning method described above, it is necessary to accurately measure the relative position between the positioning mechanism for the receptacle with respect to the optical waveguide and the positioning mechanism for the plug and receptacle, when manufacturing the receptacle.

However, with the optical connector disclosed in PTL 1, the positions of the positioning mechanisms cannot be confirmed simultaneously from the same direction, and thus measurement with a highly accurate three-dimensional dimension measuring machine is required. In such measurement, man-hours related to the measurement increase, causing an increase in the cost of dimensional measurement. As a result, the productivity of the optical connector is lowered.

Therefore, it is desirable to provide an optical connector for which it is possible to measure the relative position of positioning mechanisms from the same direction.

Solution to Problem

In order to solve the aforementioned problem, an optical connector according to a first aspect is an optical connector for optically coupling a first optical transmission path and a second optical transmission path, comprising:

a first connector part disposed so as to cover at least a part of said first optical transmission path,
said first connector part including
a first positioning portion for performing positioning with respect to said first optical transmission path;
a second positioning portion for performing positioning of said second optical transmission path held by a second connector part connected to said first connector part; and
a measurement auxiliary portion formed so as to correspond to arrangement of said second positioning portion, wherein
at least a part of said first positioning portion and at least a part of said measurement auxiliary portion are formed at positions that can be visually recognized simultaneously from the same direction.

In an optical connector according to a second aspect,
said second positioning portion is an insertion hole into which a guide pin for connection with said second connector part is to be inserted; and
said measurement auxiliary portion is formed so as to be integral with said insertion hole.

In an optical connector according to a third aspect,
said measurement auxiliary portion is formed as a concentric shape.

In an optical connector according to a fourth aspect,
said measurement auxiliary portion is formed as a recessed shape with respect to a surface of said first connector part.

Advantageous Effect

According to the present disclosure, an optical connector for which it is possible to measure the relative position of the positioning mechanisms from the same direction can be provided.

BRIEF DESCRIPTION OF THE DRAWINGS

In the accompanying drawings:

FIG. 2 is a front view illustrating a coupling surface of the first optical transmission path;

FIG. 3 is a bottom perspective view illustrating a first connector part single body;

DETAILED DESCRIPTION

Figure 1:
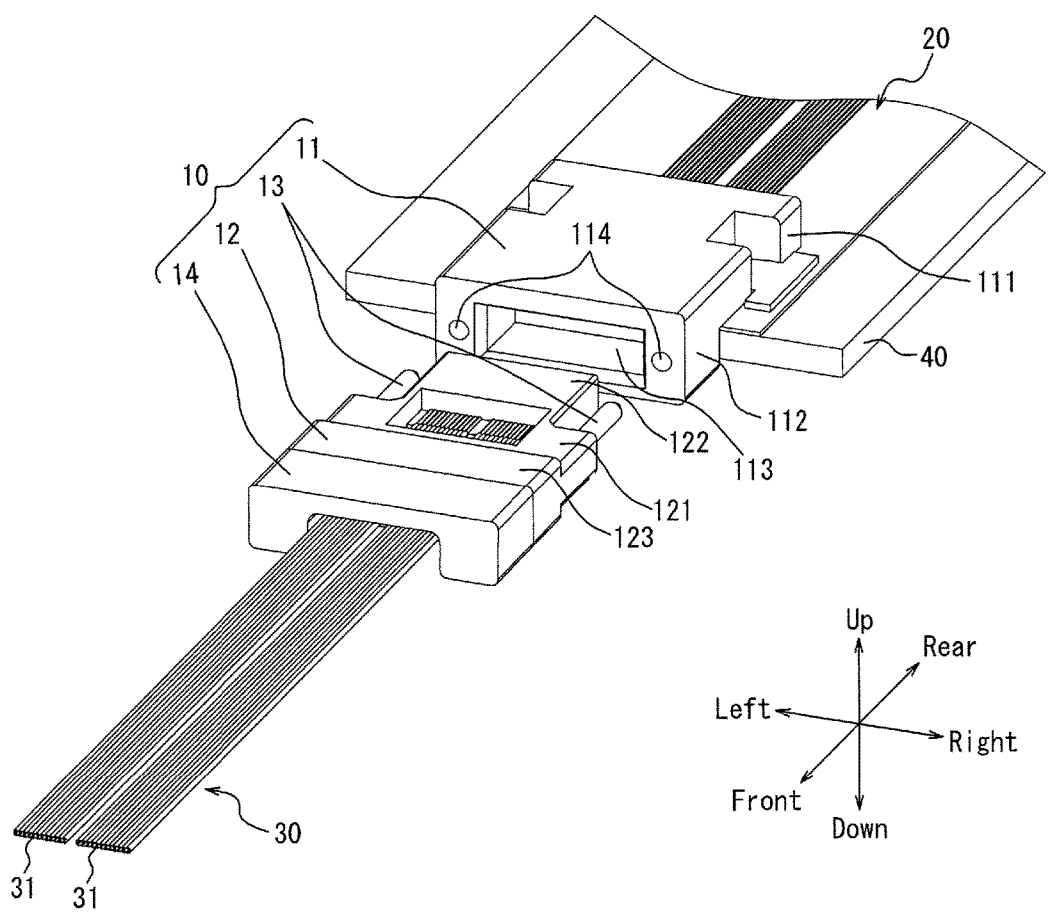
FIG. 1 is a perspective view illustrating a state in which a first optical transmission path and a second optical transmission path are optically coupled using an optical connector according to a presently disclosed embodiment.

Hereinafter, an embodiment is described in detail with reference to the accompanying drawings. Note that the directions in the following description, such as front-rear, left-right, and up-down, are based on the directions indicated by the arrows in the drawings.

Figure 4:
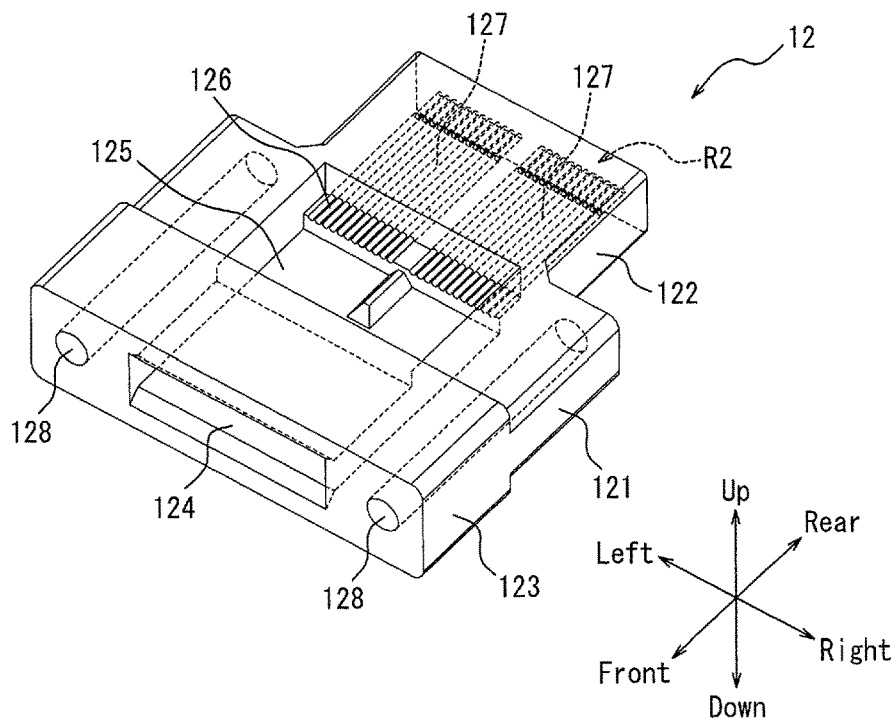
FIG. 4 is a top perspective view illustrating a second connector part single body.
Figure 5:
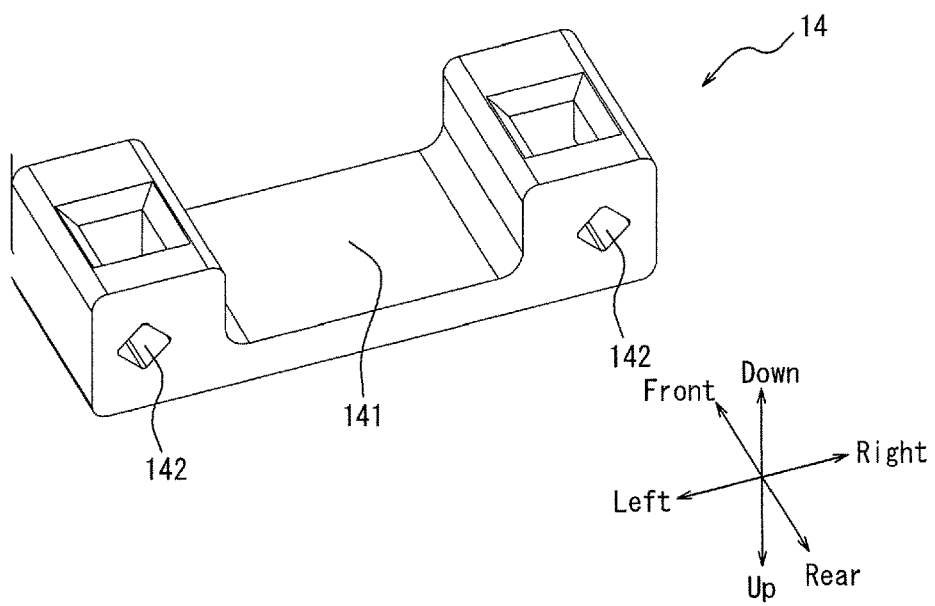
FIG. 5 is a bottom perspective view illustrating a guide pin fixing portion single body.

FIG. 1 is a perspective view illustrating a state in which a first optical transmission path 20 and a second optical transmission path 30 are optically coupled using an optical connector 10 according to the present embodiment. FIG. 2 is a front view illustrating a coupling surface R1 of the first optical transmission path 20. The optical connector 10 includes a first connector part 11, a second connector part 12, guide pins 13, and a guide pin fixing portion 14 for fixing the guide pins 13. FIG. 3 is a bottom perspective view illustrating the first connector part 11 single body. FIG. 4 is a top perspective view illustrating the second connector part 12 single body. FIG. 5 is a bottom perspective view illustrating the guide pin fixing portion 14 single body.

As illustrated in FIG. 2, the first optical transmission path 20 is formed, for example, on a substrate 40 constituted by a rigid printed wiring board. In order to optically couple with the second optical transmission path 30, the first optical transmission path 20 is formed such that the front end surface thereof coincides with the front end surface of the substrate 40. The waveguide mode of the first optical transmission path 20 may be either a single mode or a multi mode. Hereinafter, the first optical transmission path 20 is described as being formed on the substrate 40, however, the present disclosure is not limited thereto. For example, the first optical transmission path 20 may be formed so as to be embedded inside the substrate 40, with the front end surface thereof coinciding with the front end surface of the substrate 40, and the coupling surface R1 being exposed from the substrate 40.

The first optical transmission path 20 includes a cladding 21 formed as a laminate on the top surface of the substrate 40, and a plurality of cores 22 spaced from each other at predetermined intervals in the left-right direction. The cladding 21 and the cores 22 are, for example, formed from quartz glass. The refractive index of the cores 22 is higher than that of the cladding 21. In the following description, the first optical transmission path 20 is described as being, for example, an embedded type optical waveguide, however, the present disclosure is not limited thereto, and it may be an optical waveguide of an appropriate type such as a slab type or a semi-embedded type.

The second optical transmission path 30, as illustrated in FIG. 1, is constituted by a plurality of optical fibers 31. Each optical fiber 31 includes a core, a cladding, and as necessary, a coating film. The waveguide mode of each optical fiber 31 may be either a single mode or a multi mode. Each optical fiber 31 may be of any type, such as a general-purpose single mode fiber, a dispersion shift single mode fiber, or a step index multimode optical fiber. The plurality of optical fibers 31 may be bundled so as to be covered by a sheath or may not be bundled. The plurality of optical fibers 31 are arranged, for example, in a row in the left-right direction within the second connector part 12. The intervals between the cores of the plurality of optical fibers 31 arranged in a row in the second connector part 12 substantially coincide with the intervals between the cores 22 of the first optical transmission path 20.

The first connector part 11 is a receptacle, and is connected to the second connector part 12. The first connector part 11 is substantially L-shaped, and includes a base portion 111 disposed on the first optical transmission path 20, and a first opening component 112 formed so as to protrude forward from the base portion 111 in a manner continuous with the base portion 111. The first opening component 112 is formed as a frame-like shape protruding in a front-rear direction (the substrate 40 thickness direction) from the front end portion of the substrate 40 and overhanging downward from the base portion 111. That is, the first opening component 112 protrudes in a manner that the bottom surface thereof is positioned further downward than the up-down position of the first optical transmission path 20. The first connector part 11 is disposed on the first optical transmission path 20 and the substrate 40 such that the first opening component 112 is in contact with or in proximity to the front surface of the substrate 40. That is, as illustrated in FIG. 1, the first connector part 11 is formed into a shape so as to cover a part of the first optical transmission path 20 and a part of the substrate 40 from the top surface of the first optical transmission path 20 toward the front surface of the substrate 40. The first connector part 11, however, is not limited to this, and for example, when the first optical transmission path 20 is embedded inside the substrate 40, it may be disposed on the first optical transmission path 20 via a part of the substrate 40 and may cover a part of the first optical transmission path 20 together with the aforementioned part of the substrate 40.

The first connector part 11 further includes a first opening 113 in the front surface of the first opening component 112. The first connector part 11 is attached to the first optical transmission path 20 and the substrate 40 side with the coupling surface R1 of the first optical transmission path 20 exposed forward from the first opening 113.

The first connector part 11 further includes insertion holes 114 (second positioning portions) into which the guide pins 13 for connection with the second connector part 12 are to be inserted. A pair of insertion holes 114 are formed at the left and right ends in the front surface of the first opening component 112.

As illustrated in FIG. 3, the first connector part 11 includes a pair of first positioning portions 115 symmetrically disposed at a part of the left side surface and a part of the right side surface of the base portion 111. The first connector part 11 is positioned with respect to the first optical transmission path 20 by the first positioning portions 115. The pair of the first positioning portions 115 are formed so as to be recessed inward of the first connector part 11 at the rear half portions of the left and right side surface portions of the base portion 111. The first positioning portions 115 are recessed in a rectangular shape.

The first connector part 11 includes measurement auxiliary portions 116 formed so as to correspond to the arrangement of the insertion holes 114. The measurement auxiliary portions 116 are formed at positions such that at least a part of the first positioning portions 115 and at least a part of the measurement auxiliary portions 116 can be visually recognized simultaneously from the same direction.

In FIG. 3, as an example, the respective measurement auxiliary portions 116 are each formed of a single member together with the respective insertion holes 114 so as to be integrated with the respective insertion holes 114. More particularly, the respective measurement auxiliary portions 116 are each formed as a concentric circular recess communicating with the respective insertion holes 114. The respective measurement auxiliary portions 116 extend from the respective insertion holes 114 to the front walls of the respective first positioning portions 115. The respective measurement auxiliary portions 116 are formed at positions corresponding to the up-down direction positions of the respective insertion holes 114. That is, as illustrated in FIG. 3, the insertion holes 114 each has a circular shape, and the upper half portions thereof are formed above the bottom surface of the base portion 111. Therefore, the measurement auxiliary portions 116 are formed as semicircular grooves respectively at the left and right ends in the bottom surface of the base portion 111. By forming the measurement auxiliary portions 116 with such arrangement and shape, when viewing the bottom surface of the base portion 111 from a downward direction, a part of the first positioning portions 115 and a part of the measurement auxiliary portions can be confirmed simultaneously in the same horizontal plane.

The second connector part 12 is a plug, and is connected to the first connector part 11. The second connector 12 includes a base portion 121, a fitting portion 122 formed to protrude rearward from the base portion 121 in a manner continuous with the base portion 121, and a second opening component 123 formed in a manner continuous with the base portion 121 in the front direction.

As illustrated in FIG. 4, the second opening component 123 has an opening 124 formed for the second optical transmission path 30 to be inserted. The second connector part 12 includes a holding portion 125 inside the base portion 121 for holding the plurality of optical fibers 31. The second connector part 12 includes a plurality of guide grooves 126 inside the holding portion 125. The plurality of guide grooves 126 are grooves for respectively holding the plurality of optical fibers 31 constituting the second optical transmission path 30. The number of the guide grooves 126 is equal to or more than the number of the optical fibers 31 constituting the second optical transmission path 30.

The second connector part 12 includes a plurality of communication holes 127 communicating with the rear of the plurality of guide grooves 126. The second connector part 12 is configured to hold the second optical transmission path 30 with the coupling surface R2 of the second optical transmission path 30 exposed rearward from the communication holes 127. The second connector part 12 includes through-holes 128 to hold the guide pins 13 for connection with the first connector part 11. A pair of through-holes 128 are formed at the left and right ends of the second connector part 12 so as to respectively penetrate the left ends of the second opening component 123 and the base portion 121, and the right ends thereof. The width in the left-right direction of the pair of through-holes 128 is equal to the width in the left-right direction of the pair of insertion holes 114 of the first connector part 11.

As illustrated in FIG. 5, the guide pin fixing portion 14 is formed as a recessed shape, and has a recessed portion 141 in which the second optical transmission path 30 is to be disposed. The guide pin fixing portion 14 has fixing holes 142 in the rear surface for holding the guide pins 13 to connect the first connector part 11 and the second connector part 12. A pair of fixing holes 142 are formed at the left and right ends of the guide pin fixing portion 14. The width in the left-right direction of the pair of fixing holes 142 is equal to the width in the left-right direction of the pair of insertion holes 114 of the first connector part 11.

Figure 6:
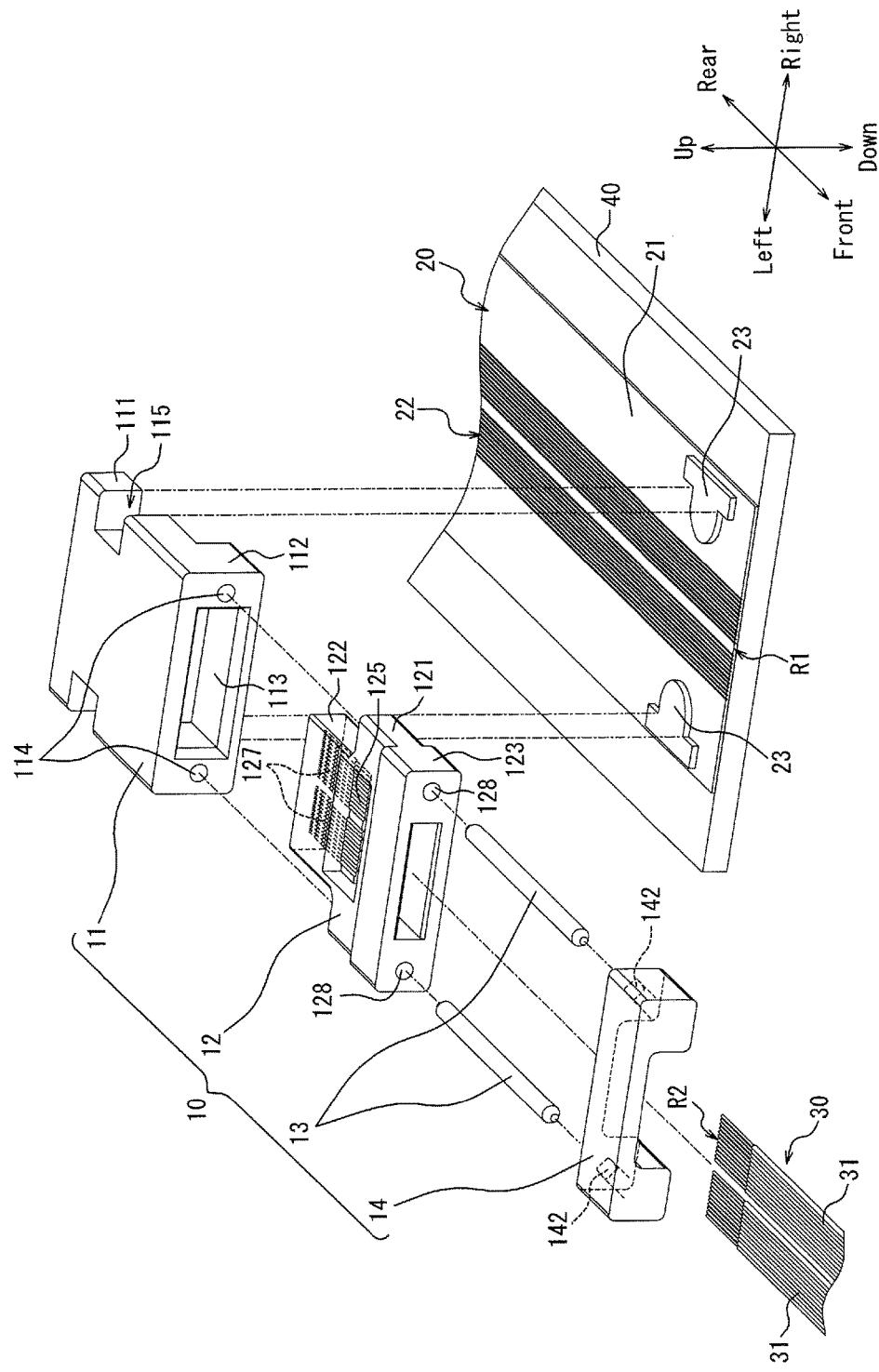
FIG. 6 is an exploded perspective view illustrating each component of the optical connector, the first optical transmission path, and the second optical transmission path of FIG. 1 in an exploded manner.

FIG. 6 is an exploded perspective view illustrating each component of the optical connector 10, the first optical transmission path 20, and the second optical transmission path 30 of FIG. 1 in an exploded manner. A procedure for optically coupling the first optical transmission path 20 and the second optical transmission path 30 by connecting the first connector part 11 and the second connector part 12 is described with reference to FIG. 6.

The first connector part 11 is attached from the above of the first optical transmission path 20. On the top surface of the first optical transmission path 20, a pair of stud pins 23 are formed at the left and right ends. When the first connector part 11 is attached to the first optical transmission path 20, a part of each first positioning portion 115 of the first connector part 11 comes into contact with a corresponding part of each stud pin 23. That is, by bringing the respective pair of first positioning portions 115 into contact with the respective pair of stud pins 23, the position of the first connector part 11 with respect to the first optical transmission path 20 is determined. After the position of the first connector part 11 is determined, the first connector part 11 is fixed on the first optical transmission path 20 or the substrate 40 by an arbitrary method. At this time, as described above, the coupling surface R1 of the first optical transmission path 20 is exposed from the first opening 113 formed in the front surface of the first connector part 11.

The second optical transmission path 30 is inserted into the second connector part 12 from the front and is held by the holding portion 125, such that the coupling surface R2 of the second optical transmission path 30 is exposed rearward from the communication holes 127.

The respective pair of guide pins 13 are fixed to the respective pair of fixing holes 142 formed at the left and right ends of the guide pin fixing portion 14.

The guide pins 13 fixed to the guide pin fixing portion 14 are respectively passed through the through-holes 128 of the second connector part 12 holding the second optical transmission path 30, to fix the guide pin fixing portion 14 and the second connector part 12.

The second connector part 12 fixed to the guide pin fixing portion 14 and the first connector part 11 fixed to the first optical transmission path 20 or the substrate 40 are arranged in the front-rear direction, such that the positions thereof substantially coincide in the up-down direction and the left-right direction. In this state, the respective pair of guide pins 13 are inserted into the respective pair of insertion holes 114 of the first connector part 11. In this way, the first opening 113 of the first connector part 11 and the fitting portion 122 of the second connector part 12 are fitted, and thus the first connector part 11 and the second connector part 12 are fitted. At this time, the position of the second connector part 12 with respect to the first connector part 11 is determined by the insertion holes 114. As a result, the coupling surface R1 of the first optical transmission path 20 and the coupling surface R2 of the second optical transmission path 30 substantially coincide, and thus the plurality of optical waveguides arranged in a row in the left-right direction constituting the first optical transmission path 20 and the corresponding plurality of optical fibers 31 constituting the second optical transmission path 30 are respectively optically coupled.

Figure 7:
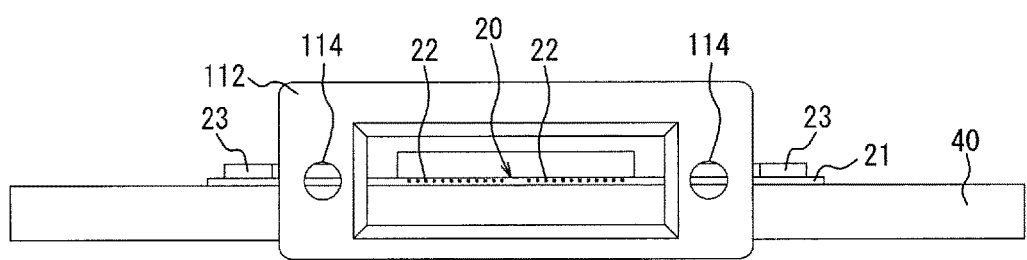
FIG. 7 is a front view of the first connector part, the first optical transmission path, and the substrate of FIG. 1.
Figure 8A:
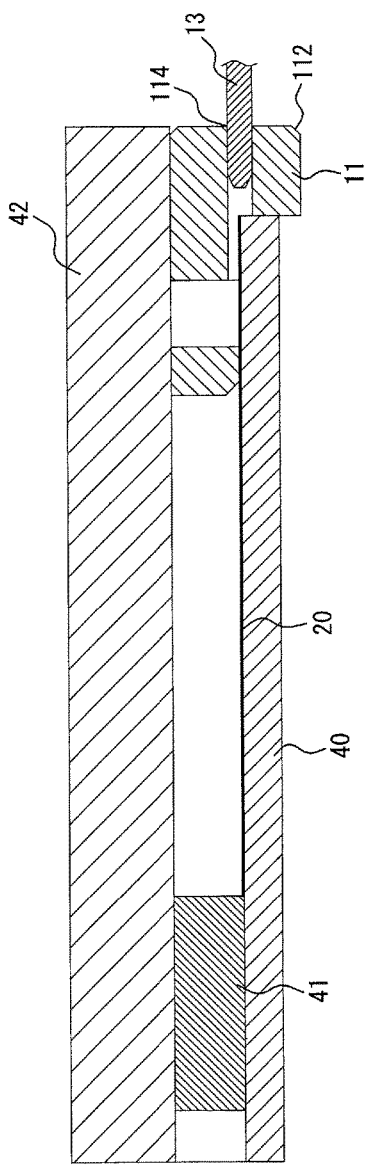
FIGS. 8A and 8B are cross-sectional views that schematically illustrate each component on the substrate behind the first connector part.
Figure 8B:
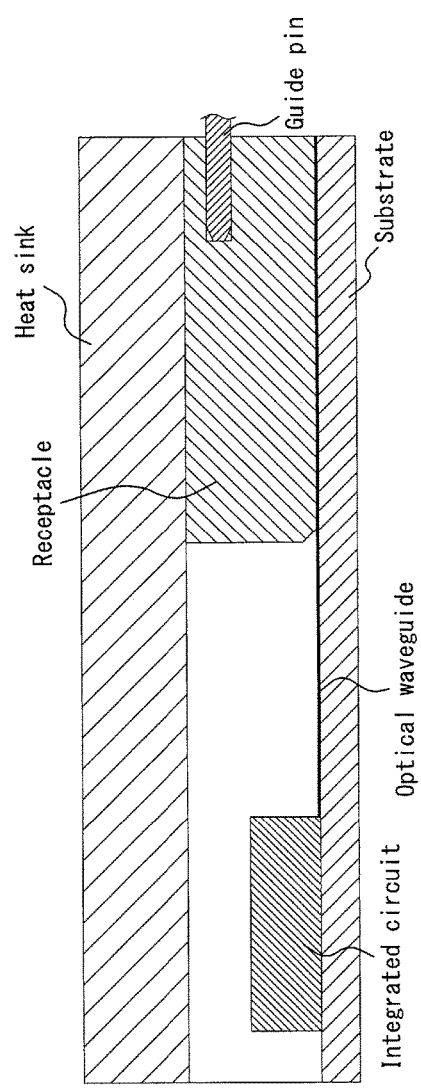

FIG. 7 is a front view of the first connector 11, the first optical transmission path 20, and the substrate 40 of FIG. 1. FIGS. 8A and 8B are cross-sectional views schematically illustrating each component on the substrate 40 behind the first connector part 11. Particularly, FIG. 8A is a cross-sectional view when the optical connector 10 according to the present embodiment is used, and FIG. 8B is a cross-sectional view when a conventional optical connector is used. Hereinafter, the insertion holes 114 formed in the first connector part 11 are described with reference to FIGS. 7, 8A, and 8B.

In the optical connector 10 according to the present embodiment, the pair of insertion holes 114 are formed such that a part of each insertion hole 114 is located within the height of the first optical transmission path 20. In FIG. 7, as an example, each insertion hole 114 is formed at a corresponding up-down position in the front surface of the first opening component 112, such that a part thereof is located within the height of the first optical transmission path 20.

As schematically illustrated in FIG. 8A, other than the first connector part 11 and the first optical transmission path 20, an integrated circuit 41 connected to the first optical transmission path 20 and a heat sink 42 for emitting heat generated from the integrated circuit 41 are arranged on the substrate 40.

The up-down direction position of each insertion hole 114 formed in the first opening component 112 of the first connector part 11 in FIG. 8A corresponds to the up-down direction position illustrated in FIG. 7. The heat sink 42 is disposed so as to be in contact with the top surface of the first connector part 11. The up-down direction position of the top surface of the first connector part 11 substantially coincides with the up-down direction position of the top surface of the integrated circuit 41. Accordingly, the heat sink 42 is configured so as to be not only in contact with the top surface of the first connector part 11, but also in contact with the top surface of the integrated circuit 41. The up-down direction position of the top surface of the first connector part 11, however, is not limited to that described above, and may be below the up-down direction position of the top surface of the integrated circuit 41. That is, the height of the base portion 111 of the first connector part 11 may be lower than the height of the integrated circuit 41.

For comparison with the optical connector 10, a conventional example is described. In FIG. 8B, similarly to the case in which the optical connector 10 according to the present embodiment is used, a receptacle, an optical waveguide, an integrated circuit, and a heat sink are disposed on the substrate. On the other hand, the conventional receptacle does not have a structure corresponding to the first opening component 112 of the optical connector 10 according to the present embodiment. Accordingly, it is necessary to insert the guide pins into the receptacle body disposed on the optical waveguide, and thus the height of the receptacle body becomes larger than the height of the base portion 111 of the optical connector 10 according to the present embodiment. Further, the front-rear width of the receptacle body also becomes longer.

In the optical connector 10 according to the present embodiment described above, since a part of the first positioning portions 115 and a part of the measurement auxiliary portions 116 can be simultaneously confirmed from the same direction, the relative position of the positioning mechanisms can be easily measured. That is, with the optical connector 10, the positional relationship between the first positioning portions 115 and the insertion holes 114 can be confirmed in the same plane via the measurement auxiliary portions 116. Thereby, the optical connector 10 does not require measurement with a highly accurate three-dimensional dimension measuring machine, and thus it facilitates measurement. Further, since measurement can be performed in two dimensions instead of three dimensions, the optical connector 10 contributes to improvement in measurement accuracy of each relative position. Therefore, measurement can be performed with high accuracy even for a fine structure of micrometer order. In addition, man-hours related to measurement are reduced, such that production cost is suppressed. As a result, the productivity of the optical connector 10 is improved. In the case of using a three-dimensional dimension measuring machine, dimensions are measured by destructive inspection, however, with the optical connector 10 according to the present embodiment, measurement is possible using a two-dimensional dimension machine, such that inspection can be performed in a non-destructive manner.

As described above, since the optical connector 10 according to the present embodiment enables dimension measurement with high accuracy, it is possible to accurately confirm positional deviation or other defects after forming the stud pins 23, the insertion holes 114, and the guide pins 13.

In the optical connector 10, since the measurement auxiliary portions 116 and the insertion holes 114 are respectively integrally formed, the positional relationship between the first positioning portions 115 and the insertion holes 114 can be measured with a higher accuracy.

By making the measurement auxiliary portions 116 respectively concentric with the shape of the insertion holes 114, the optical connector 10 can be manufactured more easily. That is, in the optical connector 10, the respective insertion holes 114 and the respective measurement auxiliary portions 116 can be manufactured in one process by a single member. Similarly, by forming the measurement auxiliary portions 116 according to a recessed shape with respect to the surface of the first connector part 11, the measurement auxiliary portions 116 of the optical connector 10 can be molded more easily, in comparison with the case in which these are formed according to a protruding shape.

In the optical connector 10, by providing the first opening component 112 and forming the first connector part 11 according to an L-like shape, the insertion holes 114 into which the guide pins 13 are to be inserted can be formed in the vicinity of up-down direction positions around the first optical transmission path 20 (see FIG. 7). Thereby, different from the conventional example illustrated in FIG. 8, it is possible to reduce the height of the base portion 111 and to miniaturize the first connector part 11. Along with this, it is also possible to miniaturize the second connector part 12 that is connected to the first connector part 11, and thus to easily miniaturize the entire optical connector 10. According to the above measuring method using the measurement auxiliary portions 116, the optical connector 10 can maintain measurement accuracy even in a miniaturized state.

In the optical connector 10, since the insertion holes 114 are formed in the front surface of the first opening component 112 at positions in the vicinity of the first optical transmission path 20, dimensioning with high accuracy can be realized with respect to the first connector part 11 and the second connector part 12, That is, in the optical connector 10, it is possible to fit the first connector part 11 and the second connector part 12 accurately. Thereby, in the optical connector 10, it is possible to optically couple the first optical transmission path 20 and the second optical transmission path 30 with high accuracy, and thus the coupling loss can be reduced.

By reducing the height of the base portion 111 of the first connector part 11, it becomes possible to bring the heat sink 42 into contact with the top surface of the integrated circuit 41, and therefore the optical connector 10 can also contribute to improvement in heat dissipation efficiency of the integrated circuit 41. That is, when the optical connector 10 according to the present embodiment is used, unlike the conventional example illustrated in FIG. 8B, the top surface of the integrated circuit 41 and the heat sink 42 are bought into contact with each other, and thereby the heat dissipation efficiency of the integrated circuit 41 is improved. In the optical connector 10, since the front-rear width of the base portion 111 is smaller than the front-rear width of the conventional receptacle body illustrated in FIG. 8B, the space between the base portion 111 and the integrated circuit 41 can be sufficiently secured, and thereby heat accumulation can be reduced. Further, in the optical connector 10, the distance between the base portion 111 and the integrated circuit 41 is shortened, such that the front-rear width of the substrate 40 can be further reduced as compared with the conventional example. Thereby, the optical connector 10 also contributes to the miniaturization of the entire substrate 40.

It will be apparent to those skilled in the art that the present disclosure can be realized in other predetermined forms other than the above described embodiment without departing from the spirit or essential features thereof. Therefore, it should be understood that the above description is an example, and does not restrict the present disclosure. The scope of the disclosure is defined by the appended claims rather than by the above description. Among any changes, several changes within the equivalent scope shall be included therein.

Figure 9:
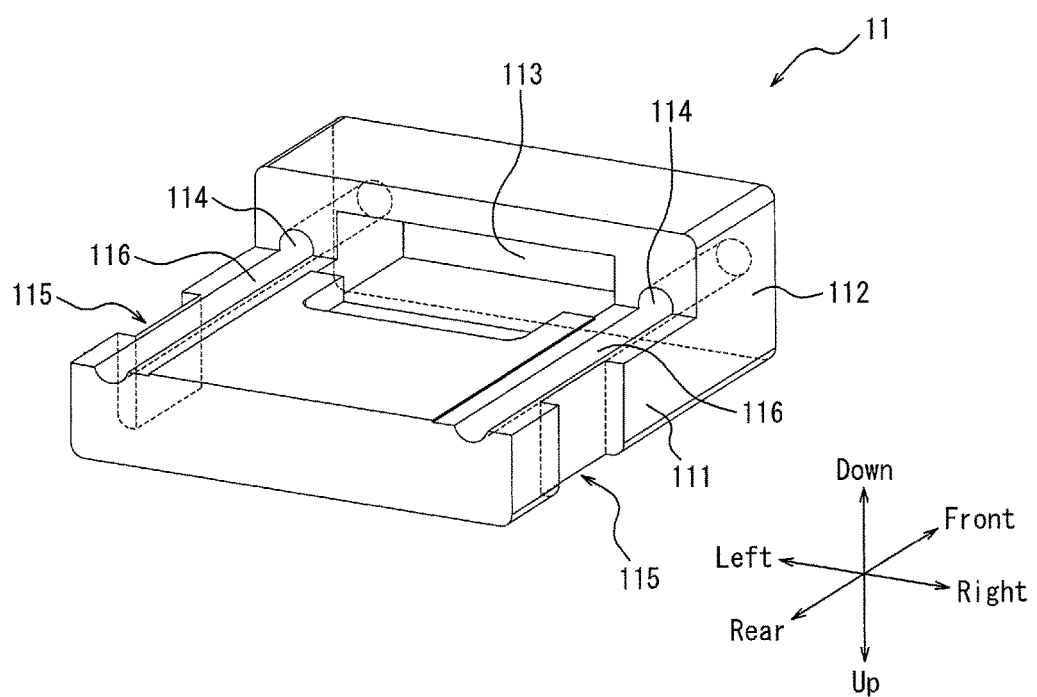
FIG. 9 is a bottom perspective view illustrating a first connector part single body according to Variation 1.
Figure 10:
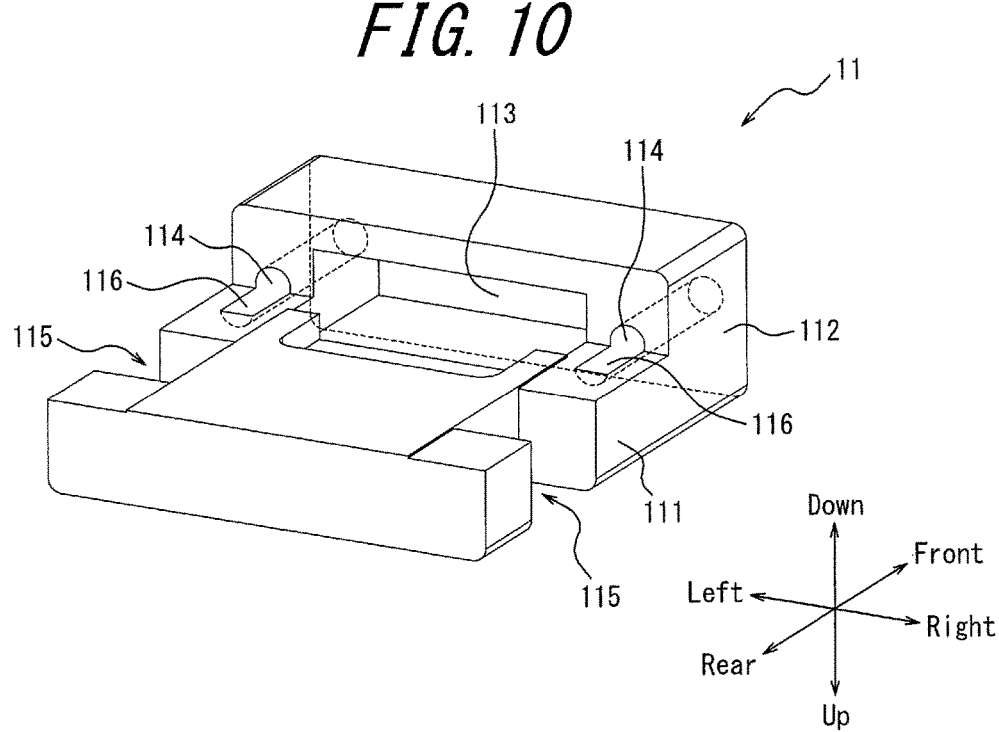
FIG. 10 is a bottom perspective view illustrating a first connector part single body according to Variation 2.
Figure 11:
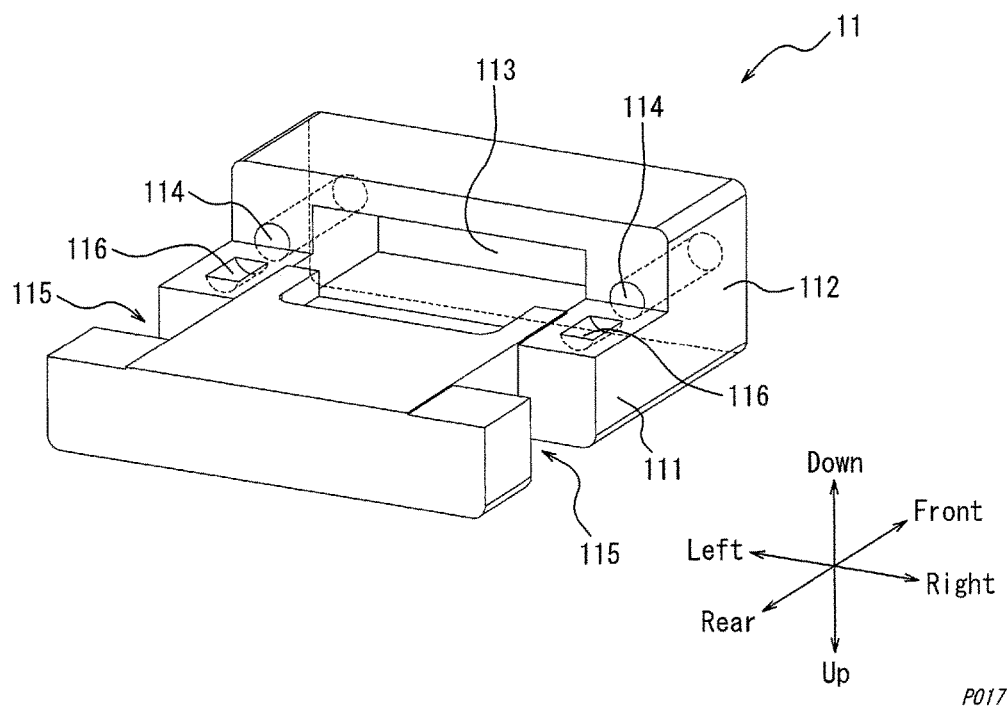
FIG. 11 is a bottom perspective view illustrating a first connector part single body according to Variation 3.

FIG. 9 is a bottom perspective view illustrating a first connector part 11 single body according to Variation 1, FIG. 10 is a bottom perspective view illustrating a first connector part 11 single body according to Variation 2, and FIG. 11 is a bottom perspective view illustrating a first connector part 11 single body according to Variation 3.

For example, the arrangement and shape of the first positioning portions 115 are not limited to the above, and may be any arrangement and shape as long as positioning with respect to the first optical transmission path 20 is possible. For example, the first positioning portions 115 may be disposed asymmetrically in a part of the left side surface and a part of right side surface of the base portion 111, or may be disposed in outer surfaces other than the left and right side surfaces. The first positioning portions 115 may be formed so as to be recessed inward according to a semicircular shape, or may be formed according to a protruding shape that protrudes outward instead of a recessed shape. The first positioning portions 115 are not limited to be formed in a pair, and may be formed by one portion as long as positioning with respect to the first optical transmission path 20 is possible.

In FIG. 3, the end walls in the left-right direction of each first positioning portion 115 are formed so as to be located further in the inward direction of the first connector part 11 than the corresponding insertion hole 114 and measurement auxiliary portion 116, however, the present disclosure is not limited thereto. For example, as illustrated in FIG. 9, the end walls in the left-right direction of each first positioning portion 115 are formed so as to be located further in the outward direction of the first connector part 11 than the corresponding insertion hole 114 and measurement auxiliary portion 116.

Also, the arrangement and shape of the measurement auxiliary portions 116 are not limited to the above, and may be any arrangement and shape as long as a part thereof can be visually recognized simultaneously with the first positioning portions 115 from the same direction.

For example, as illustrated in FIG. 10, the measurement auxiliary portions 116 are not limited to the configuration extending from the insertion holes 114 to the front walls of the first positioning portions 115, and may be formed with an arbitrary front-rear width at the left and right ends in the bottom surface of the base portion 111. In another example, the measurement auxiliary portions 116 may be formed according to a straight line shape extending from the insertion holes 114 to the rear surface of the base portion 111 beyond the front walls and rear walls of the first positioning portions 115.

The respective measurement auxiliary portions 116 are not limited to a configuration communicating with the respective insertion holes 114, and may be formed at any positions as long as they can be formed so as to correspond to the arrangement of the insertion holes 114. That is, it is unnecessary for the respective measurement auxiliary portions 116 to be each formed of a single member so as to be integrated with the respective insertion holes 114. For example, as illustrated in FIG. 11, the respective measurement auxiliary portions 116 may be formed at any portions between the respective insertion holes 114 and the front walls of the respective first positioning portions 115, or may be formed at any positions between the rear walls of the respective first positioning portions 115 and the rear surface of the base portion 111. In this manner, the respective measurement auxiliary portions 116 may be formed at any positions on the insertion lines of the respective guide pins 13 in the first connector part 11.

The measurement auxiliary portions 116 are not limited to being formed symmetrically, and may be formed asymmetrically in the left-right direction.

The measurement auxiliary portions 116 are not limited to a concentric shape, and may have any shape. For example, the insertion holes 114 are not limited to a circular shape, and when an arbitrary shape is adopted, it is preferable that the measurement auxiliary portions 116 are formed into a shape corresponding to that of the insertion holes 114. The measurement auxiliary portions 116 are not limited to being formed into a recessed shape with respect to the surface of the first connector part 11, and may be formed into protruding portions that protrude from the surface of the first connector part 11.

The pair of insertion holes 114 are not limited to the height position illustrated in FIG. 7, and may be formed at any positions as long as the corresponding measurement auxiliary portions 116 can be formed in the base portion 111.

Figure 12A:
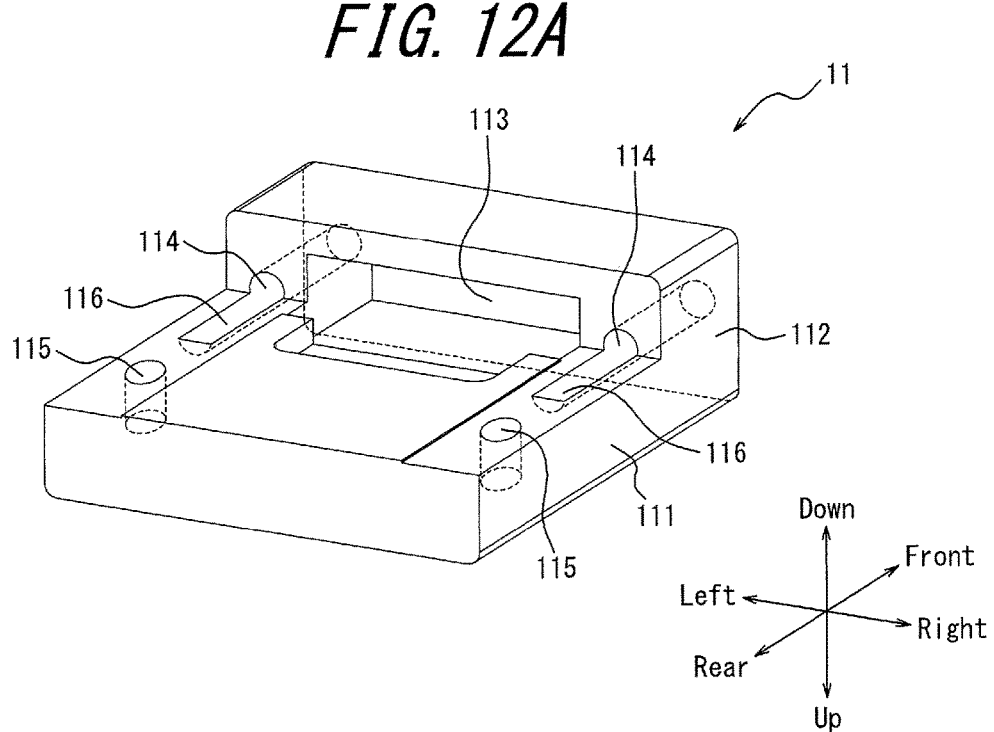
FIGS. 12A and 12B are perspective views respectively illustrating the shape of a first connector part and the shape of a first optical transmission path according to Variation 4.
Figure 12B:
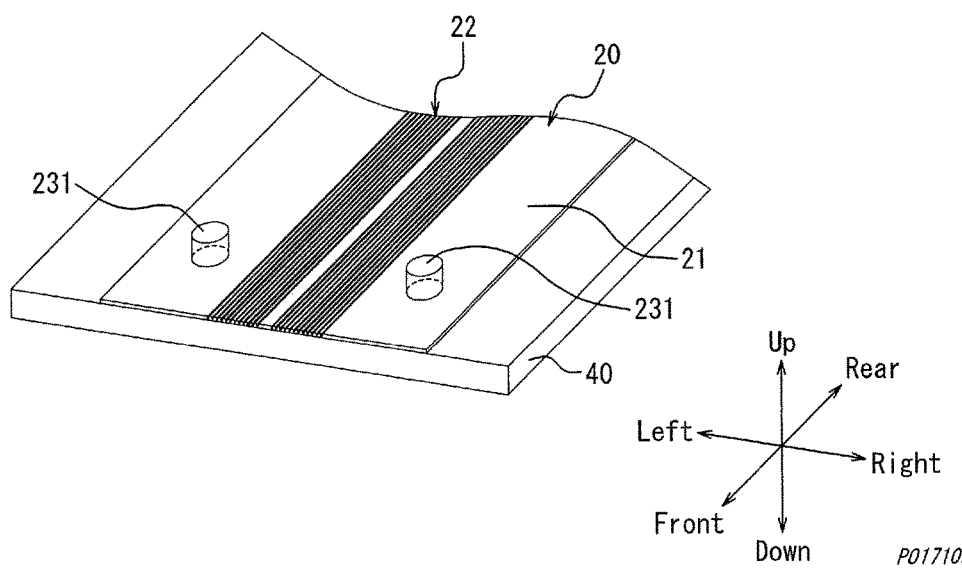

In the optical connector 10 according to the present embodiment, positioning of the first connector part 11 with respect to the first optical transmission path 20 is performed by the stud pins 23, however, the present disclosure is not limited thereto. FIGS. 12A and 12B are perspective views illustrating the shape of a first connector part 11 and a first optical transmission path 20 according to Variation 4. Particularly, FIG. 12A illustrates the shape of the first connector part 11 according to Variation 4, and FIG. 12B illustrates the shape of the first optical transmission path 20 according to Variation 4. As illustrated in FIG. 12B, cylindrical pins 231 may be formed on the first optical transmission path 20 instead of the stud pins 23. In this case, the first positioning portions 115 may be configured as recessed portions or openings in the bottom surface of the base portion 111 so as to correspond to the pins 231 protruding from the surface of the first optical transmission path 20. That is, when the first connector part 11 is attached to the first optical transmission path 20, the first positioning portions 115 are fitted with the pins 231.

For example, positioning of the first connector part 11 may be performed using the side surfaces of the first optical transmission path 20 or the like, without forming any additional positioning structures, such as the stud pins 23 and the pins 231, on the first optical transmission path 20 or the substrate 40. As for a first connector part 11 having a structure corresponding to such a positioning method, similarly to the optical connector 10 according to the present embodiment, it is possible to form the corresponding measurement auxiliary portions 116. As described above, in the optical connector 10 according to the present embodiment, the first connector part 11 is not limited to the shape described above, and may have any shape as long as a part of the components corresponding to the first positioning portions 115 and a part of the components corresponding to the measurement auxiliary portions 116 can be visually recognized simultaneously from the same direction.

REFERENCE SIGNS LIST

10 Optical connector
11 First connector part
111 Base portion
112 First opening component
113 First opening
114 Insertion hole (second positioning portion)
115 First positioning portion
116 Measurement auxiliary portion
12 Second connector part
121 Base portion
122 Fitting portion
123 Second opening component
124 Second opening
125 Holding portion
126 Guide groove
127 Communication hole
128 Through-hole
13 Guide pin
14 Guide pin fixing portion
141 Recessed portion
142 Fixing hole
20 First optical transmission path
21 Cladding
22 Core
23 Stud pin
231 Pin
30 Second optical transmission path
31 Optical fiber
40 Substrate
41 Integrated circuit
42 Heat sink
R1 Coupling surface
R2 Coupling surface

The invention claimed is:

1. An optical connector for optically coupling a first optical transmission path and a second optical transmission path, comprising:
a first connector part disposed so as to cover at least a part of said first optical transmission path,
said first connector part including
a first positioning portion for performing positioning with respect to said first optical transmission path;
a second positioning portion for performing positioning of said second optical transmission path held by a second connector part connected to said first connector part, wherein the second position portion comprises at least one insertion hole extending from an outermost surface of the first connector part on a side to which the second connector part is connected to an inside of the first connector part; and
a measurement auxiliary portion formed so as to correspond to arrangement of said second positioning portion, wherein the measurement auxiliary portion is formed on a first surface of the first connector part opposite to an outermost surface with respect to the insertion hole so as to be sandwiched between the insertion hole and the first positioning portion, wherein the first surface on which the measurement auxiliary portion is formed is coplanar with a second surface on which the first positioning portion is formed, and wherein
at least a part of said first positioning portion and at least a part of said measurement auxiliary portion are formed at positions that can he visually recognized simultaneously from the same direction.

2. The optical connector according to claim 1, wherein said at least one insertion hole comprises two insertion holes each configured to receive a respective guide pin for connection with said second connector part; and
said measurement auxiliary portion comprises two grooves each integrally formed with said two insertion holes, respectively.

3. The optical connector according to claim 1, wherein said measurement auxiliary portion is formed as a respectively concentric shape with the shape of said second positioning portion formed in a circular shape.

4. The optical connector according to claim 1, wherein said measurement auxiliary portion is formed as a recessed shape with respect to a surface of said first connector part.

* * * * *